United States Patent Office 3,209,010
Patented Sept. 28, 1965

3,209,010
POLYALKYLATED MONOUREINS
Domenick D. Gagliardi, East Greenwich, William J. Jutras, Jr., Peace Dale, and Egon Stern, Providence, R.I., assignors to Gagliardi Research Corporation, East Greenwich, R.I., a corporation of Rhode Island
No Drawing. Filed Nov. 13, 1961, Ser. No. 152,068
21 Claims. (Cl. 260—309.7)

This invention relates to nitrogenous heterocyclic compounds, alkylol and alkoxyalkyl derivatives thereof and useful products prepared therefrom. Such nitrogenous compounds are a class of compounds which are generally represented by the formula:

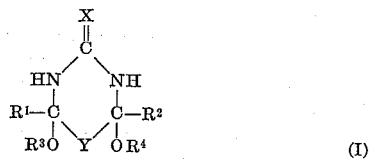

(I)

in which X is oxygen, sulfur or an imino radical; $R^1$ and $R^2$ are hydrogen or the same or different organic radicals; Y is a connecting carbon to carbon bond or a methylene radical; and $R^3$ and $R^4$ are the same or different radicals and together may form a divalent bridging radical.

FIELD OF THE INVENTION

Monoureins are a class of heterocyclic compounds having the general formula:

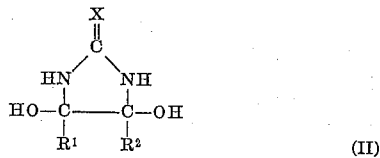

(II)

which may be prepared by known methods through the acid condensation of urea, thiourea, or guanidine with an α,β-dicarbonyl compound such as glyoxal, diacetyl, acetyl acetone, pyruvic aldehyde, phenyl glyoxal, dibenzoyl, etc. These compounds, which are 4,5-dihydroxy-imidazolidines derivatives readily dehydrate and rearrange to form hydantoins according to the following formula:

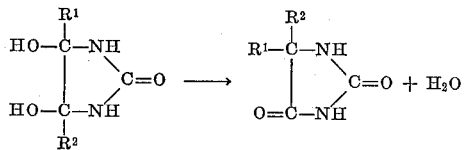

The rearrangement has been extensively reported in the literature, e.g., see (1) J.A.C.S., vol. 75, July 5, 1953, page 3138; (2) J.A.C.S., vol. 78, June 20, 1956, page 2740; and (3) Berichte, 41, 169 (1908).

Compounds such as the monoureins containing the grouping:

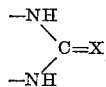

(Where X=oxygen, sulfur or imino.)

are very useful intermediates for the production of aldehyde condensates for the treatment of textile materials. Methylol and alkoxymethyl condensates may be made from such compounds:

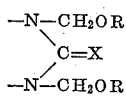

(Where R=H or alkyl.)

Such condensates are described in the literature, e.g., U.S. Patents 2,661,312 and 2,764,573. Since the condensates contain only tertiary nitrogen groups, they produce textile finishes which are resistant to chlorine bleaches because the nitrogens cannot react with the chlorine to form chloramines, as in the case with urea and melamine derived aminoplasts.

The methyl and alkoxymethyl derivatives of monoureins are deficient in producing completely chlorine resistant finishes on textiles because of the ease with which the compounds rearrange into hydantoins as described above. The rearrangement may occur during production of the condensates or during the application or curing thereof on textile materials. In textile use, the hydantoin formation is very undesirable since simple formaldehyde condensates of hydantoins behave as formaldehyde donors, i.e., the

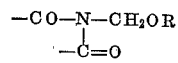

group is not stable and liberates free formaldehyde. When this occurs, secondary —NH— groups form on textiles and these retain chlorine. Moreover, the desirable properties of crease resistance and shrinkage control are not produced by such hydantoin condensates on textiles.

OBJECTS

A principal object of this invention is the provision of new nitrogenous heterocyclic compounds which possess a number of unique properties. Further objects include:

(1) The provision of new stable forms of monoureins which do not rearrange into hydantoins.

(2) The provision of methods for transforming 4,5-dihydroximidazolidines into 4,5-disubstituted imidazolidines which do not undergo rearrangement into hydantoins.

(3) The provision of new alkylol and alkyl alkoxy derivatives of a new class of 4,5-disubstituted imidazolidines.

(4) The provision of new finishing agents which may be used to produce crease resistance, shrink resistance, water repellency and oil repellency to fabrics without imparting chlorine degradation characteristics thereto that are typical of textile finishing agents derived from urea, melamine and the like.

(5) The provision of crease-proof cellulosic fibers and fabrics which are substantially free of so-called chlorine retention.

(6) The provision of new water-soluble cellulose cross-linking agents.

(7) The provision of new water and oil repellent textile finishing agents.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by the reaction of the two hydroxyl groups in the 4,5- or 4,6-positions of a monourein or related nitrogenous dihydroxy organic compound with a suitable reagent to form new stable derivatives which did not rearrange into hydantoins. The reagents used and the process employed are such that only the dihydroxy groups are reacted leaving the —NH— groups of the monourein available for subsequent reaction with, for example, formaldehyde to produce hydroxymethyl or alkoxymethyl condensates.

The products of this invention derived from heterocyclic dihydroxy alkylene urea compounds may be represented by the following formula:

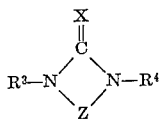
(III)

wherein X is oxygen, sulfur, or imino; $R^3$ and $R^4$ are H, alkyol or alkoxy alkyl radicals and Z is a divalent bridging radical selected from the group consisting of (A)

where $R^1$ and $R^2$ are hydrogen, alkyl, or aryl radicals; $R^5$ and $R^6$ are alkyl, hydroxyalkyl, alkoxyalkyl, haloalkyl, alkylcarbonyl, haloalkylcarbonyl, alkylcarbamyl, carbamyl, or cyanoalkyl radicals; and Y is a carbon to carbon bond or a methylene radical.

(B)
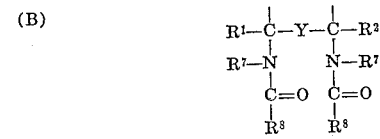

where $R^1$, $R^2$, and Y have the same designation previously assigned, and $R^7$ and $R^8$ are hydrogen, alkyl or aryl radicals.

(C)
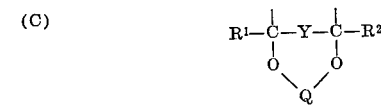

where $R^1$, $R^2$, and Y have the saame designation previously assigned and Q is a divalent radical selected from the groups consisting of methylene, alkylmethylene, dialkoxy silicylene, carbonyl, and formyl methylene, and (D)
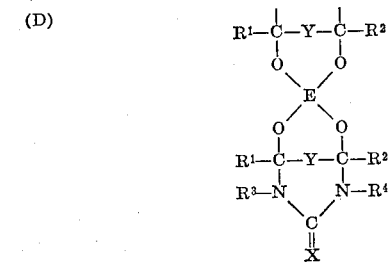

where X, $R^1$, $R^2$, $R^3$, $R^4$, and Y have the same designation previously assigned and E is Si or an α, ω-alkadienyl group.

Compounds represented by Formula III and which may be obtained according to the processes of the invention are of the following specific types:

4,5-dialkoxy-imidazolidone-2
4,5-bis(alkylcarboxamido)-imdazolidone-2
4,5-bis(alkylcarboxyl)-imidazolidone-2
4,5-bis(alkylcarbamyloxy)-imidazolidone-2
4,5-bis(alkylcarboxyl)-imidazolidone-2
4,5-bis(cyanoalkoxy)-imidazolidone-2
4,5-bis(haloalkyl carboxyl)-imidazolidone-2
4,5-bis(hydroxyalkoxy)-imidazolidone-2
4,5-bis(alkoxyalkoxy)-imidazolidone-2
4,5-dialkyl-4,5-dialkoxy-2-imino-imidazolidine
4,5-diaryl-4,5-dialkoxy-2-thio-imidazolidine
1,3-bis(methylol)-4,5-dialkoxy-imidazolidone-2
1,3-bis-(alkoxymethyl)-4,5-dibenzyl-4,5-bis(perfluoroalkoxy)-imidazolidone-2
1,3-bis(methylol)-4,5-dialkoxy-2-imino-imidazolidine
1,3-bis(methylol)-4,5-dialkyl-4,5-dialkoxy-2-thio-imidazolidine
1,3-bis(methylol)-4,6-dialkoxy-1,3-diazolidone-2
1,3-bis(methylol)-4,6-dialkoxy-2-thio-1,3-diazolidine
1,3-bis(alkoxymethyl)-4,6-dialkoxy-2-imino-1,3-diazolidine
2-alkyl-4,6-bis(methylol)-1,3-dioxolano[4,5-d]imidazolidone-5
4,6-bis-(alkoxymethyl)-2,5-dioxo-1,3-dioxolano[4,5-d]imidazolidine
α,ω-bis(4,6-dimethylol-1,3-dioxolano[4,5-d]imidazolidin-2-yl)-alkane
2,2-dialkoxy-4,6-bis(alkoxymethyl)-1,3,2-dioxasilolano[4,5-d]imidazolidone-5
2,2'-spirobi(4,6-dimethylol-1,3,2-dioxasilolano[4,5-d]imidazolidone-5)
4,5-diethoxy-imidazolidone-2
4,5-bis(formamido)-4,5-dimethyl-imidazolidone-2
4,5-bis(acetoxy)-4,5-diphenyl-imidazolidone-2
2-butyl-4,6-dimethylol-1,3-dioxolano[4,5-d]imidazolidone-5
2-butyl-1,3-dioxolano[4,5-d]imidazolidone-5
4,5-bis(methyl carbamyloxy)-imidazolidone-2
3α,6α-diphenyl-2,5-dioxo-1,3-dioxolano[4,5-d]imidazolidine
2,2'-spirobi(3α,6α-dimethyl-1,3,3-dioxasilolano[4,5-d]imidazolidone-5)
bis(1,3-dioxolano[4,5-d]imidazolidin-2-yl)propane
4,5-bis(perfluorobutyl carboxyl)imidazolidone-2
4,5-bis(cyanobutoxy)-4,5-dimethoxy-imidazolidone-2
1,3-dimethylol-4,5-dipropoxy-imidazolidone-2
1,3-bis(ethoxymethyl)-4,5-bis(formamido)-4,5-dimethyl-imidazolidone-2
1,3-bis(methylol)-4,5-bis(butyl carboxyl)-imidazolidone-2
1,3-bis(propoxymethyl)-4,5-bis(ethoxymethoxy)-imidazolidone-2
1,3-bis(butoxymethyl)-4,5-bis(heptadecanoxy)-imidazolidone-2
2-nonyl-4,6-bis(ethoxymethyl)-1,3-dioxolano[4,5-d]imidazolidone-5
2,2-dibutoxy-4,6-bis(methylol)-1,3,2-dioxasilolano[4,5-d]imidazolidone-5
4,6-bis(ethoxymethyl)-1,3-dioxolano[4,5-d]imidazolidone-5
1,3-dipropylol-4,5-dimethoxy-imidazolidone-2
1,3-bis(ethoxypropyl)-4,5-diethoxy-imidazolidone-2

The preparation of the compounds of this invention is accomplished by first providing a dihydroxy 5 or 6 membered heterocyclic compound of the monourein type shown in Formula II by the known procedures stated above and is referred to herein as stage 1.

The dihydroxy nitrogenous compound is then reacted, in stage 2, under acid conditions with a suitable reagent which contains at least one active hydrogen group which only reacts with the hydroxy groups of the monoureins. The reaction conditions are such that the two —NH— groups of the monoureins are not affected. Both hydroxyl groups are thus modified. The reagent containing the active hydrogen group may be a mono-alcohol, monoamide, anhydride, aldehyde, isocyanate, orthoester, ester, dialdehyde or α-ethylenic nitrile. Examples of suitable reagents include formamide N-methyl formamide, methanol, ethylene glycol, acetic acid, dodecyl alcohol, methylene glycol, hydrated aldehydes, perfluorobutyric acid, stearamide glycine, glycerol, and the like. Preferred groups of the reagents are alkanols, monoamides, glycols, alkanals, mono-carboxylic acids and/or the esters of one to six carbon atoms.

The reagent provides a moiety which becomes a part of the monourein reaction product. The moiety may be a group such as alkyl, hydroxyalkyl, alkoxyalkyl, haloalkyl, alkylcarbonyl, haloalkylcarbonyl, alkyl carbamyl, carbamyl, cyanoalkyl, methylene, alkylmethylene, dialkoxysilicylene, carbonyl, and formyl methylene. Under certain conditions two monourein molecules may form a spirobi silicon reaction product or a bis-monourein derivative of an alkane.

The second stage reaction may be carried out in water, inert solvent, or in excess of reagent until water is split off.

The following are typical second stage reactions of the monoureins with suitable reagents. R and $R^1$ denote alkyl groups in these reactions. Although the reactions are shown typically with 4,5-dihydroxy ethylene urea, other dihydroxy nitrogenous compounds which can also be reacted in similar fashion are represented by the following formula:

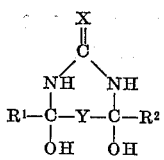

(IV)

wherein $R^1$, $R^2$ and Y have the meaning specified in connection with Formula I.

2ND STAGE REACTIONS (1) Reaction with mono-alcohols:

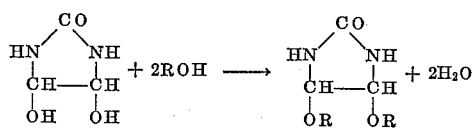

(2) Reaction with mono-amides:

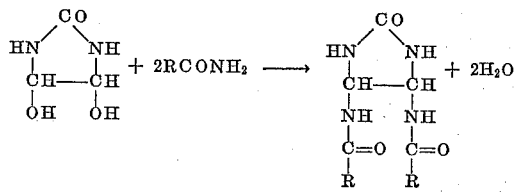

(3) Reaction with anhydrides:

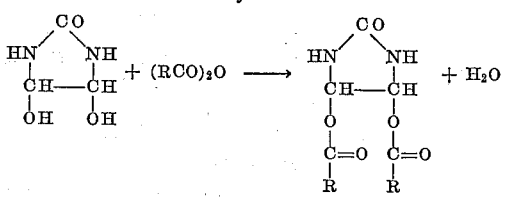

(4) Reaction with aldehydes:

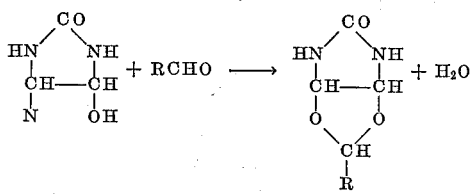

(5) Reaction with isocyanates:

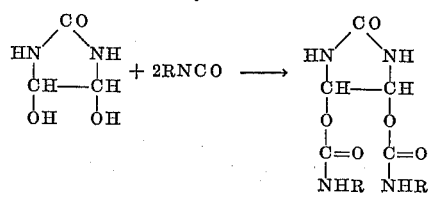

(6) Reaction with ortho esters:

(a)
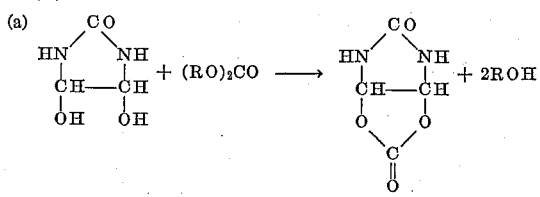

(b)
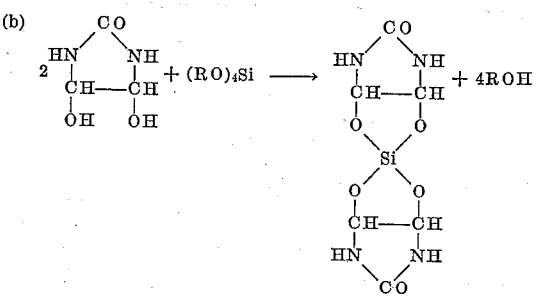

(7) Reaction with dialdehydes:

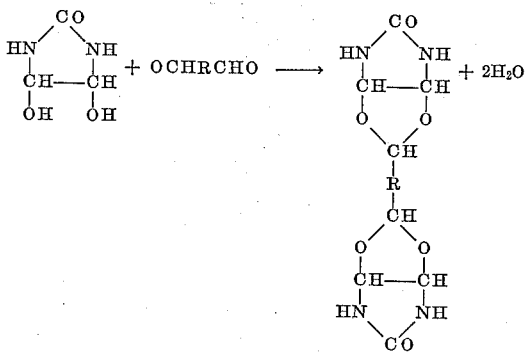

(8) Transesterification:

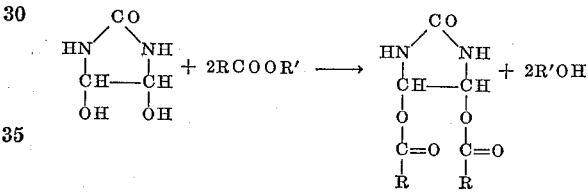

(9) Michaelson addition to double bonds:

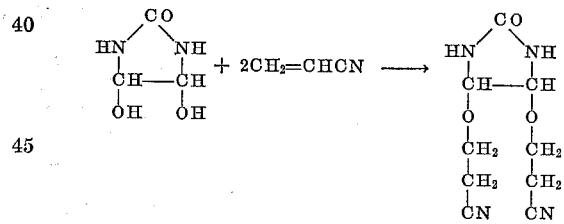

In the above second stage reactions, typical reaction products are as follows:

(1) 4,5-dialkoxy-imidazolidone-2
(2) 4,5-bis(alkylcarboxamido)-imidazolidone-2
(3) 4,5-bis(alkylcarboxyl)-imidazolidone-2
(4) 2-alkyl-1,3-dioxolano[4,5-d]imidazolidone-5
(5) 4,5-bis(alkylcarbamyloxy)-imidazolidone-2
(6a) 2,5-dioxo-1,3-dioxolano[4,5-d]imidazolidine
(6b) 2,2′-spirobi(1,3,2-dioxasilolano[4,5-d]imidazolidone-5)
(7) α,ω - bis(1,3 - dioxolano[4,5 - d]imidazolidin - 2-yl)-alkane
(8) 4,5-bis(alkylcarboxyl)-imidazolidone-2
(9) 4,5-bis(cyanoethoxy)-imidazolidone-2

The modified nitrogenous heterocyclic reaction products of the second stage are further reacted in stage 3 with two or more moles of an aldehyde, especially formaldehyde, under alkaline conditions to form the dialkylol adduct with the —NH— groups of the modified monoureins. The adducts produce stable thermosetting resins and cellulose cross-linking agents. Alternatively, the modified monoureins may be reacted with an aldehyde and alcohols under alkaline, followed by acid conditions, to produce bis(alkoxy alkyl) adducts. Such hydroxymethylation may be accomplished with both acid and alkaline pH's. However, pH's of 8–9 appear to produce the better products. The alkoxymethlation should be performed, at least in the final stages, at acid pH's and preferably at a pH of 3 to 5.

Useful reaction products may be obtained by combining stages two and three. The pH should be acid and preferably 3 to 5.

Examples

A more complete understanding of the new processes and products of this invention may be had by reference to the following detailed description of operations performed in accordance with the invention. In the examples, all parts or percentages are by weight unless otherwise specified.

Example 1

1,3-dimethylol - 4,5 - bis (hydroxyethyloxy)-imidazolidone-2:

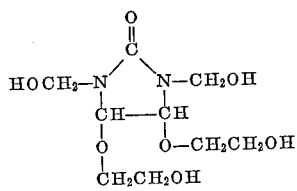

*Stage 1.*—465 parts of 75% glyoxal (6 moles) were added to 300 parts of water in a resin reaction vessel and heated to 70° C. until all of the glyoxal had dissolved. The solution was cooled to 30° C. and 360 parts of urea (6 moles) were added thereto. By heating and cooling the reaction mixture was kept at 50° C. for 2 hours at pH 4.3. The mixture was cooled to 25° C. and neutralized to pH 7.1 with dilute NaOH. Analysis for glyoxal showed that only 1.72% remained and that the reaction to form the 4,5-dihydroxy-ethylene urea was 94% completed. The resulting solution was stripped under reduced pressure to eliminate all water.

*Stage 2.*—30 parts of crystalline 4,5-dihydrodroxyethylene urea prepared as in Stage 1 (0.25 mole) and 31 parts of ethylene glycol (0.50 mole) were mixed together. The pH was adjusted to 4.0 with methyl phosphoric acid and the mixture was heated. At 50° C. no reaction had taken place. After 10 minutes heating at 80° C., a homogeneous clear product was obtained. The reaction was allowed to continue at 80° C. for two hours. After cooling to 25° C., 100% yield of the ethylene glycol addition product was obtained.

*Stage 3.*—61 parts of the bis-ethylene glycol adduct of 4,5-dihydroxyethylene urea (0.25 mole) were mixed with 40.5 parts of 37% formaldehyde solution (0.50 mole). The pH of the mixture was adjusted to 10.0 with dilute NaOH. The reaction was exothermic. After 2 hours heating at 50° C., the solution was cooled to 25° C. and neutralized to pH 7.4 with dilute HCl. A free formaldehyde analysis showed that 92% of the dimethylol compound of the bis-ethylene glycol adduct of 4,5-dihydroxyethylene urea had formed. This was completely soluble in water.

Example 2

1,3-dimethylol-4,5-dimethoxy-imidazolidone-2:

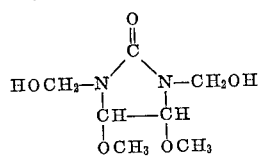

*Stage 1.*—Same as in Example 1 above.

*Stage 2.*—30 parts of 4,5-dihydroxyethylene urea (0.25 mole) prepared as in Example 1 above were mixed with 32 parts of anhydrous methyl alcohol (1.00 mole). The pH of the mixture was adjusted to 4.0 with methyl phosphoric acid. The mixture was heated to reflux temperature of 67–73° C. After 30 minutes, a homogeneous clear solution formed. Refluxing was continued for 2 hours. The solution was cooled to 25° C. and stripped under vacuum to remove the excess methanol. There were obtained 40.3 parts of 100% yield of the crystalline 4,5-dimethoxyethylene urea.

*Stage 3.*—40.5 parts of 37% formaldehyde (0.5 mole) and 40 parts of 4,5-dimethoxyethylene urea were mixed and the pH was adjusted to 10.0 with dilute NaOH. After heating at 50° C. for 2 hours, the free formaldehyde content was 3.18% indicating 83% yield of the dimethylol compound of 4,5-dimethoxyethylene urea. The product was adjusted to 50% active solids and neutralized to pH 7.5 with dilute HCl. It was completely water miscible.

Example 3

2-propyl-4,6-bis(methylol)-1,3-dioxolano [4,5-d] imidazolidone-5:

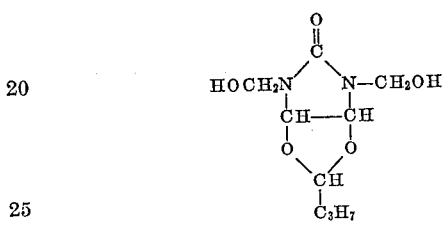

*Stage 1.*—Same as in Example 1 above.

*Stage 2.*—178 parts of dimethyl formamide as solvent, 38 parts of butyraldehyde (0.5 mole) and 60 parts of 4,5-dihydroxyethylene urea (0.5 mole) were mixed. The pH was adjusted to 4.4 with formic acid. The mixture was heated to 70–80° C. It required 75 minutes for the reaction to become homogeneous. Heating was continued for 90 minutes at 70–80° C. A fluid solution finally resulted. The water, which formed from the reaction, was removed in a separatory funnel and by vacuum stripping the reaction product.

*Stage 3.*—170 parts of a dimethyl formamide solution of the butyrl acetal of 4,5-dihydroxyethylene urea (0.5 mole) were mixed with 81 parts of 37% formaldehyde (1.0 mole). The pH was adjusted to 10.0 with dilute NaOH. The solution was heated to 50° C. and maintained at 50–60° C. for 120 minutes. The product was cooled and neutralized to pH 7.5. The free formaldehyde content showed that the reaction was 81% complete.

Example 4

1,3-bis(methoxymethyl) - 4,5 - bis(formamido)-imidazolidone-2:

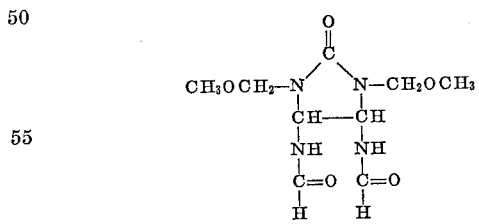

*Stage 1.*—Same as in Example 1 above.

*Stage 2.*—45 parts of formamide (excess moles) and 21 parts of 4,5-dihydroxyethylene urea (0.18 mole) were mixed and the pH was adjusted to 4.3 with formic acid. The mixture was heated to 120° C. and then kept at 70–90° C. for three hours. Under reduced pressure, the excess formamide was distilled off the mixture. A sample of the residue, after recrystallization from methanol, did not melt at 290° C. Yield of the crude product was 91%.

*Stage 3.*—17.2 parts (0.1 mole) of the bis 4,5-formamidoethylene urea and 6.6 parts of 91% paraformaldehyde dissolved in 100 parts (excess) methanol were adjusted to pH of 5.0 with phosphoric acid. The mixture was refluxed for 3 hours to form the bis methoxymethyl ether of the substituted ethylene urea. The product was neutralized to pH 7.0 with dilute NaOH. It was water miscible.

Example 5

1,3-bis(methoxymethyl) - 4,5 - bis(acetoxy)imidazolidone-2:

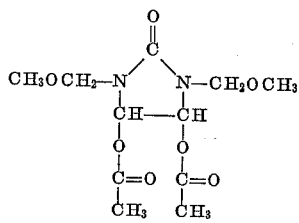

*Stage 1.*—Same as in Example 1 above.

*Stage 2.*—24 parts of 4,5-dihydroxyethylene urea (0.20 mole) and 102 parts of acetic anhydride (excess) with 2 drops of concentrated $H_2SO_4$ were charged in the reaction vessel. Exotherm ensued. Temperature was allowed to rise to 90° C. until reaction was completed. The reaction mixture was cooled and then vacuum stripped to remove unreacted acetic anhydride. The reaction product was found to be soluble in the lower alcohols and acetone.

*Stage 3.*—The reaction product from above was dissolved in 0.5 mole of formaldehyde dissolved in 4 moles of methanol. The mixture was acidified to pH 3.5 with $H_3PO_4$ and refluxed for 3 hours. At the end of the reflux cycle 87% of the formaldehyde had reacted to form the product.

Example 6

1,3-bis(methoxymethyl) - 4,5 - bis(methoxymethoxy)-imidazolidone-2:

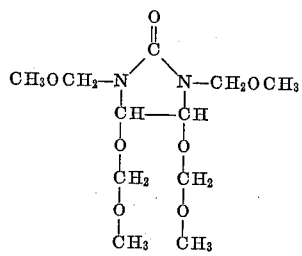

*Stage 1.*—Same as in Example 1 above.

*Stage 2.*—30 parts of 4,5-dihydroxyethylene urea (0.25 mole) and 30 parts of formaldehyde (1.00 mole) were placed in 66 parts of methanol (2.0 moles) large excess). The mixture was refluxed at pH 10.0 to form a clear solution.

*Stage 3.*—The above clear solution was cooled and acidified to pH 4.0 with methylphosphoric acid. The addition compound was refluxed at pH 4.0 for 120 minutes to complete the methoxymethylation of both the di-hydroxy and the di-imino groups. The final product was neutralized to pH 7.0 with dilute NaOH. A free formaldehyde analysis showed that the reaction was 60% completed.

Example 7

2,2-diethoxy-4,6-bis(isopropoxymethyl) - 1,3,2 - dioxasilolano[4,5-d]imidazolidone-5:

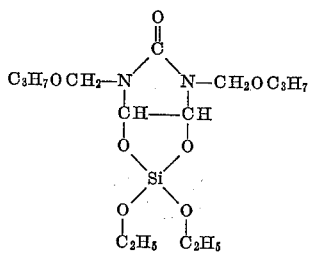

*Stage 1.*—Same as in Example 1 above.

*Stage 2.*—30 parts of 4,5-dihydroxyethylene urea (0.25 mole) were added to 100 parts of dimethyl formamide and heated until dissolved. At 75–80° C., 52 parts of tetraethoxy silicate were added. Two layers formed. The mixture was cooled to room temperature and acidified with concentrated HCl to pH 2.1. The mixture was heated to 50–60° C. After 1 hour, the reaction produced a clear homogeneous product in ethanol, formed as a by-product of the transesterification reaction. The reaction product was stripped under vacuum to remove 39 parts of volatile by-products. Approximately 55% yield of the orthosilicate ester of the monourein was obtained. This was left in dimethyl formamide.

*Stage 3.*—The crude reaction product from above, 149 parts of solution (0.25 mole) was mixed with 16.5 parts of 91% paraformaldehyde in excess isopropanol. The pH was 2.1. The mixture was refluxed 4 hours. Most of the paraformaldehyde dissolved during the reaction. From the free formaldehyde analysis, it was estimated that 85% of the bis-isopropyl oxymethyl derivative had formed.

Example 8

3α,6α-dimethyl-4,6-bis(methoxymethyl)-1,3 - dioxolano [4,5-d)]-imidazolidone-5:

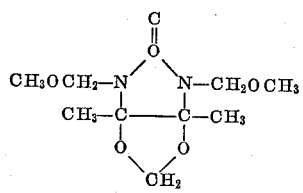

*Stage 1.*—60 parts of urea (1.0 mole) and 86 parts of diacetyl (1.0 mole) were dissolved in 200 parts of water. The pH was adjusted to 5.0. The mixture was allowed to stand seven days at room temperature. The crystalline 4,5-dimethyl-4,5-dihydroxyethylene urea was filtered and dried.

*Stage 2.*—73 parts of the above monourein (0.5 mole) and 16.5 parts (0.5 mole) of 91% paraformaldehyde were dissolved in 200 parts of dimethyl formamide and adjusted to pH 2.0 with $H_2SO_4$. The mixture was heated at 100–110° C. until water evolution stopped. A clear solution of the cyclic acetal of 4,5-dimethyl ethylene urea was obtained.

*Stage 3.*—The acetal from Stage 2 (0.5 mole) was mixed with 33 parts of 91% paraformaldehyde dissolved in excess methanol. The pH was adjusted to 4.5 and the mixture was heated for 2 hours at 80° C. After cooling, the clear solution was neutralized to pH 7.5 with dilute NaOH. Free formaldehyde analysis showed that 90% reaction yield had been obtained.

Example 9

1,3 - bis(methoxymethyl)-4-5-bis-stearyloxy-4-methyl-imidazolidone-2:

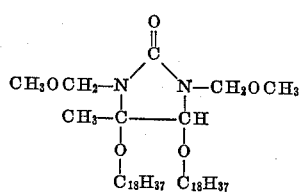

*Stage 1.*—60 parts of urea (1.0 mole) and 144 parts of 50% pyruvic aldehyde (1.0 mole) were mixed and the pH was adjusted to 5.5 with formic acid. The mixture was heated at 40° C. for 5 hours, cooled to 25° C. and vacuum stripped. A yellow semi-crystalline product was obtained.

*Stage 2.*—The crude 5-methyl-4,5-dihydroxyethylene urea (1.0 mole) was mixed with 540 parts of stearyl alcohol and 1 part of phosphoric acid. The mixture was heated to 100° C. After 2 hours a clear melt had formed.

The water of reaction was distilled off under reduced pressure and the product was cooled. A yellow wax-like product was obtained.

*Stage 3.*—The product of Stage 2 above (1.0 mole) was mixed with 99 parts of 91% paraformaldehyde (3.0 moles) dissolved in 1000 parts of methanol (excess). The pH was adjusted to 4.0. The mixture, after 3 hours refluxing, was a clear yellow solution. The product was not water soluble. When mixed with 50 parts of triethanolamine dodecyl benzene sulfonate (emulsifier) the product was dispersible in water.

*Example 10*

1,3 - bis(butoxymethyl) - 4,5-diphenyl-4,5-dibutoxy-2-thio-imidazolidine:

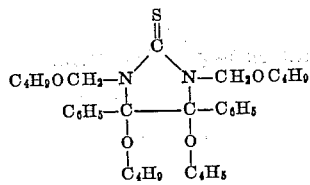

*Stages 1 and 2*—76 parts of thiourea (1.0 mole), 210 parts of benzil, and 1000 parts of butanol were mixed with 1 part of butylphosphoric acid. The mixture was refluxed together with an azeotropic separator until approximately 36 parts (2 moles) of water were removed in 6 hours to form a butanol solution of 4,5-diphenyl-4,5-dibutoxy-ethylene thiourea.

*Stage 3.*—The product from Stages 1 and 2 above was mixed with 66 parts of 91% paraformaldehyde and refluxed 5 hours until water evolution stopped. A clear yellow resin forming lacquer formed.

*Example 11*

1,3 - bis(ethoxymethyl) - 4,5-dimethyl-4,5-diethoxy-2-imino-imidazolidine:

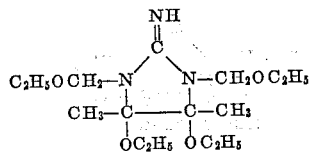

*Stage 1.*—95.5 parts (1.0 mole) of guanidine hydrochloride, 150 parts of water and 86 parts (1.0 mole) of diacetyl were heated together at 70° C. and at pH of 5.3. After 3 hours, a dark brown solution formed. The reaction mixture was cooled to room temperature and neutralized to pH 7.5 with NaOH. After freezing, the dark crystalline pulp was filtered and air dried.

*Stage 2.*—The dark crystalline 4,5-dihydroxy-4,5-dimethyl ethylene guanidine from above was mixed with 1000 parts of ethanol and refluxed at pH 5.0 for one hour.

*Stage 3.*—After the one hour reflux, 66 parts of 91% paraformaldehyde were added. The mixture was heated until all the paraformaldehyde had reacted. A dark solution formed. This was cooled and neutralized to ph 7.0.

*Example 12*

1,3-bis(methoxymethyl) - 4,5 - bis(perfluorononyl carboxyl)-imidazolidone-2

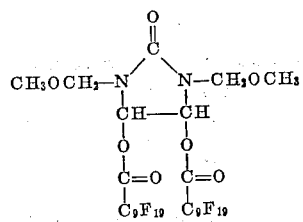

*Stage 1.*—Same as in Example 1 above.

*Stage 2.*—30 parts of 4,5-dihydroxyethylene urea (1.25 moles) were mixed with 200 parts (excess) of perfluorodecanoic acid, 2 drops of concentrated sulfuric acid, and 200 parts of xylol. The mixture was azeotroped until about 4 parts of water were collected from the esterification. The reaction mixture was then vacuum stripped until a water-free viscous liquid remained.

*Stage 3.*—The product from above was mixed with 500 parts of methanol and 16.5 parts of 91% paraformaldehyde (0.50 mole) and refluxed until a clear solution product formed. Formaldehyde analysis showed that 90% reaction had occurred.

*Example 13*

1,3-bis(methoxymethyl)-4,5-dimethoxy - imidazolidone-2:

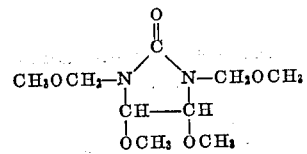

*Stages 1 and 2.*—60 parts of urea (1.0 mole) were mixed with 150 parts (1.0 mole) of the tetramethyl acetal of glyoxal, which had been prepared by heating glyoxal monohydrate with excess methanol under acidic conditions. Two drops of concentrated H₂SO₄ were added, and the mixture was heated at 80° C. for 4 hours by which time the formation of the 4,5-dimethoxyethylene urea was completed.

*Stage 3.*—To the above reaction mixture were added 120 parts of a 55% solution of formaldehyde in methanol (2.2 moles). The mixture was refluxed at pH 4.0 for three hours, by which time the methoxy-methylation was essentially completed. Free formaldehyde in the sample was 3.1%.

*Example 14*

2-formyl-4,6-bis(methoxymethyl)-1,3-dioxolano[4,5–d]imidazolidone-5:

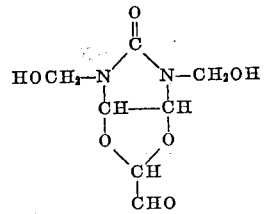

*Stage 1.*—Same as in Example 1 above.

*Stage 2.*—36 parts of 4,5-dihydroxyethylene-urea from above (0.3 mole) and 23.5 parts of 75% glyoxal (0,3 mole) were mixed in 125 parts of dimethyl formamide as solvent. The pH was kept at 4–6. The mixture was heated at 70–80° C. A clear amber solution resulted. The initial glyoxal content was 9.6%. Heating was continued until the free glyoxal content showed 75% of the reaction had been completed.

*Stage 3.*—The above reaction product was mixed with 48.6 parts of 37% formaldehyde (0.6 mole) and the pH was adjusted to 8.5 with Na₂CO₃. The mixture was heated at 50° C. until all of the formaldehyde had reacted as determined by free formaldehyde analysis.

*Example 15*

1,3 - bis(methoxymethyl)-4,5-dimethyl - 4,5 - bis(perfluoroethoxy)imidazolidone-2:

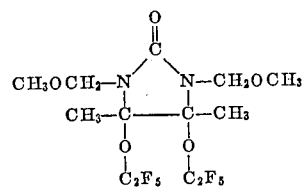

*Stage 1.*—Same as in Example 8 above.

Stage 2.—14.7 parts of the 4,5-dihydroxy-4,5-dimethylethylene urea (0.1 mole) were mixed with 50 parts of perfluoroethanol (excess) and 2 drops of concentrated $H_2SO_4$ in 100 parts of dimethyl formamide. The mixture was heated at 80° C. for 2 hours. It was stripped under vacuum until 30 parts of a viscous residue remained.

Stage 3.—The above residue was mixed with 10.1 parts of 55% formaldehyde in methanol and an extra 100 parts of methanol. The pH was 3.0. The mixture was refluxed until all of the formaldehyde had reacted as determined by free formaldehyde analysis. The product was water miscible.

Example 16

1,3 - dimethylol - 4,5 - bis(hydroxymethyloxy) - imidazolidone-2:

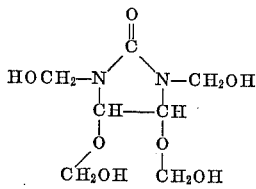

Stages 1, 2, and 3.—A simultaneous reaction was carried out by dissolving in water 60 parts of urea (1.0 mole), 77.5 parts of 75% glyoxal powder (1.0 mole) and 324 parts of 37% formaldehyde (4.0 moles). The mixture was adjusted to pH 4.0 and heated to 50° C. Within one hour, the solution was colorless and clear. After another 2 hours heating at 50° C., the free aldehyde content showed that the reaction was 70% completed. The product was neutralized to pH 7.0 with dilute NaOH.

The products obtained from the third stage find uses commensurate with the number of carbon atoms contained in the alkyl groupings. With lower alkyl groups, i.e., those containing from one to about eleven carbon atoms, the products are water soluble, stable compounds which make cellulosic textile materials shrink-resistant and crease-resistant without reducing the lightfastness of dyed fabrics and without being damaged by chlorine bleaches. With higher alkyl groups, i.e. those containing from about twelve to about eighteen carbon atoms, compounds are produced which are useful for preparing water repellant, oil repellency, spot and stain resistance and other desirable effects. These products may be applied from water dispersions, solutions or emulsions or from organic solvent solutions or dispersions. The products containing perfluoroalkyl groups are suitable finishing agents which produce water repellency, oil repellency, dimensional stability, and crease resistance.

The following three examples illustrate the superior properties of the products of this invention when used as textile treating agents:

Example 17

Pieces of undyed 80 x 80 cotton fabrics were padded through solutions containing 5% solids of various water miscible preparations of this invention and 1.0% magnesium chloride hexahydrate as catalyst. The new materials of this invention were compared to dimethylol 4,5-dihydroxyethylene urea (DMHEU). In one case a commercially available product was used. In another case, a laboratory prepared product was used. The impregnated fabrics were dried for 5 minutes at 250° F. and then were cured for 5 minutes at 300° F. The treated fabrics were tested for shrinkage resistance in laundering, for crease resistance, for tensile strength, and for resistance to chlorine damage both on the initial fabrics and after the fabrics had been laundered five times under alkaline wash conditions. The results of these tests are shown in Table I.

TABLE I

| Product applied | Percent Shrinkage in Washing | Warp Crease Recovery Angle | Percent Strength Loss After Chlorine Test | |
|---|---|---|---|---|
| | | | Unlaundered | Laundered |
| Untreated Control | 5.6 | 75 | 5 | 3 |
| Commercial (DMHEU) | 1.5 | 130 | 27 | 65 |
| Laboratory (DMHEU) | 1.9 | 133 | 42 | 90 |
| Product of Example 16 | 1.6 | 135 | 2 | 5 |
| Product of Example 13 | 1.1 | 129 | 0 | 9 |
| Product of Example 1 | 1.9 | 134 | 9 | 0 |
| Product of Example 15 | 2.1 | 128 | 0 | 7 |
| Product of Example 3 | 1.0 | 140 | 6 | 9 |
| Product of Example 8 | 0.9 | 121 | 10 | 4 |

The results of these tests clearly demonstrate that the new substituted monoureins of this invention are highly resistant to alkaline chlorine bleaching and that this resistance is maintained after alkaline washing conditions which degrade the normal dimethylol 4,5-dihydroxymonoureins treated fabrics.

Example 18

Samples of 6 cotton fabrics which had been dyed with fiber reactive dyes (Procions of Imperial Chemical Industries) were treated with some of the products of this invention as in Example 17 and compared to the commercial products, including the well known dimethylol ethylene urea (DMEU). The dried and cured pieces were exposed in a standard Fade-Ometer for 20, 40 and 60 hours. The degree of dye fading was examined. The results of these tests are shown in Table II.

TABLE II

| Product applied: | Effect on dye fading compared to the fading of untreated fabric. |
|---|---|
| DMEU | Badly faded after 20 hours. |
| DMHEU | No fading on 60 hours. |
| Product of Example 1 | Do. |
| Product of Example 8 | Do. |
| Product of Example 16 | Do. |

These results demonstrate the commonly known deficiency of dimethylol ethylene urea in greatly reducing the lightfastness of dyed fabrics to which it is applied. They also show that the new substituted hydroxymonourein-formaldehyde condensates do not affect the lightfastness of dyes. These results and those from Table I clearly demonstrate the superiority of the new products of this invention over dimethylol ethylene urea in lightfastness properties, and over the unmodified di-hydroxymonoureins in chlorine resistance.

Example 19

Samples of 80 x 80 cotton fabrics were treated with water dispersions of the products of Examples 15, 9 and 12 along with 0.5% $ZrOCl_2 \cdot 8H_2O$ as catalyst. The applied solids were 5% on fabric weight. The impregnated fabrics were cured 10 minutes at 300° F. The treated fabrics were highly resilient and crease resistant. Those treated with the two fluoroalkyl containing ureins (Examples 15 and 12) were highly resistant to staining by oils and were also resistant. The stearyl derived product of Example 9 produced a highly water repellent finish on the fabric.

Having provided a complete description of the invention in such manner as to distinguish it from other inventions and from what is old, and having provided a description o fthe best mode contemplated of carrying out the invention, the scope of patent protection to be granted the invention is defined by the following claims:

We claim:
1. A compound of the formula:

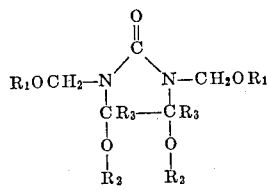

wherein
$R_1$ and $R_3$ are hydrogen, and
$R_2$ is hydroxyalkyl of 1 to 18 carbon atoms.

2. A compound of the formula:

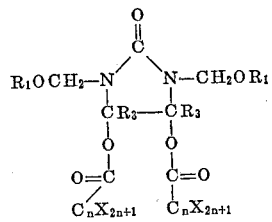

wherein
$R_1$ and $R_3$ are radicals selected from the group consisting of hydrogen and lower alkyl,
X is selected from the group consisting of hydrogen and halogen, and
$n$ is an integer from 1 to 18.

3. A compound of the formula:

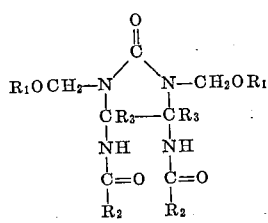

wherein $R_1$ and $R_3$ are selected from the group consisting of hydrogen and lower alkyl and $R_2$ is selected from the group consisting of hydrogen and 1 to 18 carbon atom alkyl.

4. A compound of the formula:

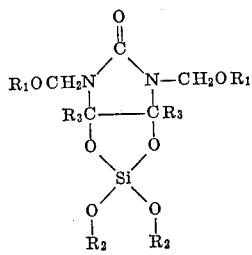

wherein
$R_1$ and $R_3$ are selected from the group consisting of hydrogen and lower alkyl, and
$R_2$ is 1 to 18 carbon atoms alkyl.

5. A compound of the formula:

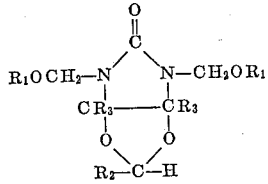

wherein $R_1$ and $R_3$ are selected from the group consisting of hydrogen and lower alkyl, and $R_2$ is selected from the group consisting of hydrogen and 1 to 18 carbon atom alkyl.

6. A compound of the formula:

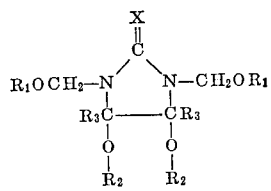

wherein
$R_1$ is selected from the group consisting of hydrogen and lower alkyl,
X is selected from the group consisting of oxygen, sulfur and imino,
$R_2$ is selected from the group consisting of alkyl and hydroxyalkyl of 1 to 18 carbon atoms.
$R_3$ is selected from the group consisting of lower alkyl and phenyl.

7. A compound of the formula:

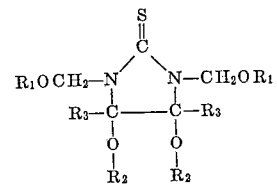

wherein $R_1$ and $R_2$ are lower alkyl and $R_3$ is phenyl.

8. A compound of the formula:

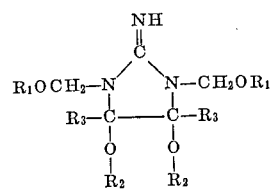

wherein $R_1$, $R_2$ and $R_3$ are lower alkyl.

9. A compound of the formula:

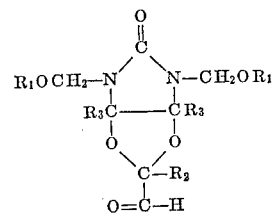

wherein $R_1$, $R_2$ and $R_3$ are selected from the group consisting of hydrogen and lower alkyl.

10. A compound of the formula:

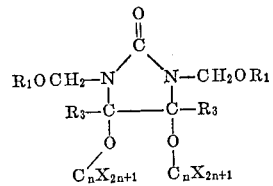

where $R_1$ and $R_3$ are selected from the group consisting of hydrogen and lower alkyl,
X is halogen, and
$n$ is an integer from 1 to 18.

11. 1,3-bis(lower alkoxy methyl)-4,5-bis(perfluoroalkoxy)-imidazolidone-2.

12. 1,3 - bis(methoxymethyl) - 4,5 - dimethyl - 4,5 - bis(perfluoroethoxy)-imidazolidone-2.

13. 1,3-bis(lower alkoxy methyl)-4,5-bis(perfluoro 1-18 carbon atom alkyl carboxyl)-imidazolidone-2.

14. 1,3-bis(lower alkoxy methyl)-4,5-bis-stearyloxy-imidazolidone-2.

15. 2,2-bis(1 to 18 carbon atom alkoxy)-4,6-bis(lower alkoxy methyl)-1,3,2-dioxasilolano [4,5-d] imidazolidone-5.

16. 1,3 - dimethylol - 4,5 - bis(hydroxyethyloxy) - imidazolidone-2.

17. 1,3 - bis(methoxymethyl) - 4,5 - (perfluorononyl carboxyl)-imidazolidone-2.

18. 1,3 - bis(methoxymethyl) - 4,5 - bis - stearyloxy - 4-methyl-imidazolidone-2.

19. 2 - propyl - 4,6 - bis(hydroxymethyl) - 1,3 - di - oxolano [4,5-d] imidazolidone-5.

20. 1,3 - bis(methyoxymethyl) - 4,5 - bis(formamido) - imidazolidone-2.

21. 2,2 - diethoxy - 4,6 - bis(isopropoxymethyl) - 1,3,2 - dioxasilolano [4,5-d] imidazolidone-5.

References Cited by the Examiner

UNITED STATES PATENTS

| | | | |
|---|---|---|---|
| 2,370,839 | 3/45 | Burke et al. | 260—309.7 |
| 2,373,136 | 4/45 | Hoover et al. | 260—309.7 |
| 2,764,573 | 9/56 | Reibnitz et al. | 260—309.7 |
| 2,777,857 | 1/57 | König | 260—309.7 |
| 2,847,418 | 8/58 | Steele et al. | 260—309.7 |
| 2,955,057 | 10/60 | Gagliardi et al. | 117—139.4 |
| 3,029,164 | 4/62 | Seki et al. | 260—309.7 |
| 3,043,718 | 7/62 | Hurwitz | 117—139.4 |

FOREIGN PATENTS

| | | |
|---|---|---|
| 946,882 | 8/56 | Germany. |
| 779,849 | 7/57 | Great Britain. |

OTHER REFERENCES

American Cyanamid Co., The Chemistry of Acrylonitrile, 2nd Ed., pp. 24–25, N.Y., American Cyanamid, 1959.

Migrdichian, Organic Synthesis, vol. I, page 16, N.Y., Reinhold, 1957.

Royal's Advanced Organic Chemistry, pp. 605, 627–29, Edgewood Cliffs, Prentice-Hall, 1954.

Rumens Melliand, Textilberichte, vol. 39, pp. 300–308 (1958).

WALTER A. MODANCE, *Primary Examiner.*

IRVING MARCUS, RICHARD D. NEVIUS, NICHOLAS S. RIZZO, *Examiners.*